United States Patent [19]

Ehlers et al.

[11] 4,134,964
[45] Jan. 16, 1979

[54] PROCESS AND APPARATUS FOR PURIFYING WET-PROCESSED PHOSPHORIC ACID

[75] Inventors: Klaus P. Ehlers, Erftstadt Lechenich; Gero Heymer, Erftstadt Liblar, both of Fed. Rep. of Germany

[73] Assignee: Hoechst Aktiengesellschaft, Frankfurt am Main, Fed. Rep. of Germany

[21] Appl. No.: 815,248

[22] Filed: Jul. 13, 1977

Related U.S. Application Data

[63] Continuation of Ser. No. 618,056, Sep. 30, 1975, abandoned.

[30] Foreign Application Priority Data

Oct. 4, 1974 [DE] Fed. Rep. of Germany ....... 2447390

[51] Int. Cl.$^2$ .............................................. C01B 25/18
[52] U.S. Cl. ................................................ 423/321 R
[58] Field of Search ...................... 423/167, 320, 321 R

[56] References Cited

U.S. PATENT DOCUMENTS

| | | | |
|---|---|---|---|
| 1,787,192 | 12/1930 | Fiske | 423/321 |
| 1,836,672 | 12/1931 | Larsson | 423/320 |
| 2,885,263 | 5/1959 | Peet | 423/167 |
| 2,885,264 | 5/1959 | Peet | 423/167 |
| 3,186,793 | 6/1965 | Gillis et al. | 423/321 |
| 3,453,076 | 7/1969 | Long et al. | 423/167 |
| 3,494,736 | 2/1970 | Carothers et al. | 423/321 |
| 3,505,013 | 4/1970 | Araki et al. | 423/167 |
| 3,552,918 | 1/1971 | Fitch et al. | 423/167 |
| 3,632,307 | 1/1972 | Es | 423/167 |

FOREIGN PATENT DOCUMENTS 37-3701  6/1962  Japan ........................ 423/167

*Primary Examiner*—O. R. Vertiz
*Assistant Examiner*—Thomas W. Roy
*Attorney, Agent, or Firm*—Connolly and Hutz

[57] ABSTRACT

Process and apparatus for purifying crude wet-processed phosphoric acid containing free sulphuric acid. To this end, the wet-processed phosphoric acid is treated in a reaction zone, at a temperature of 70° C to 100° C, with a calcium compound and with calcium sulphate seed crystals; the sulphuric acid is precipitated in the form of calcium sulphate semihydrate with the resultant formation of a suspension; a proportion of the suspension, with the calcium sulphate semihydrate seed crystals present therein, is recycled to the reaction zone; the balance of the suspension is treated for separation of purified phosphoric acid from the accompanying precipitate; the precipitate is transformed into an aqueous suspension and the calcium sulphate semihydrate in said suspension is converted into calcium sulphate dihydrate; the aqueous phase of the suspension is separated from the solid matter therein, and the solid matter is water-washed; a proportion of the aqueous phase so separated is recycled together with a proportion of the wash water, for use in suspending and converting calcium sulphate semihydrate to dihydrate; and the balance of the aqueous phase and wash water are combined with the said purified phosphoric acid.

9 Claims, 1 Drawing Figure

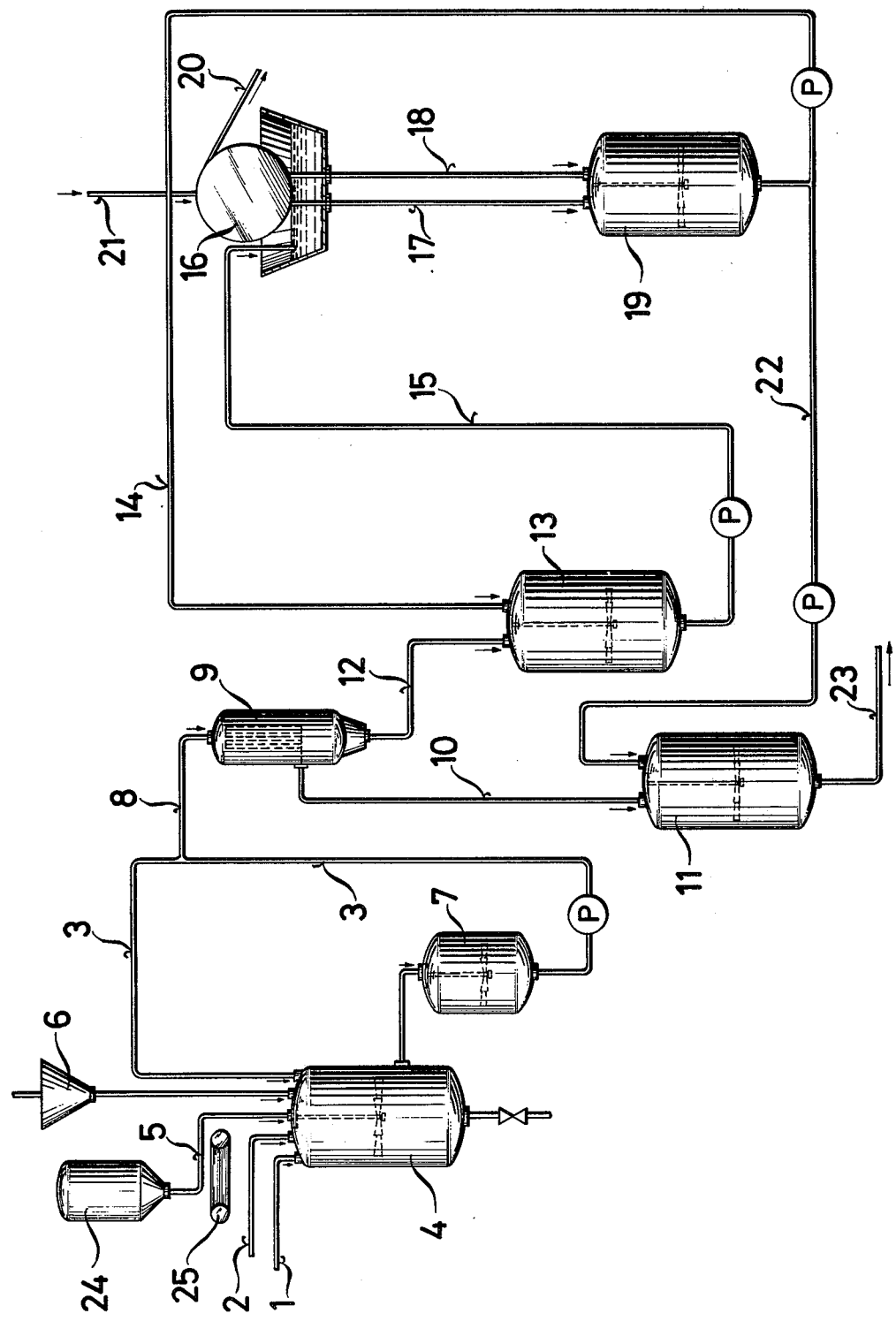

PROCESS AND APPARATUS FOR PURIFYING WET-PROCESSED PHOSPHORIC ACID

This application is a continuation of Ser. No. 618056, filed Sept. 30, 1975, now abandoned.

The present invention relates to a process and an apparatus for purifying crude wet-processed phosphoric acid containing free sulphuric acid, at an elevated temperature, by treating the acid to be purified with a calcium compound the nature and proportion of which are such as to precipitate the sulphuric acid in the form of calcium sulphate, the acid to be purified being treated also with calcium sulphate seed crystals and with one or more alkali metal compounds, silicic acid or a derivative thereof and one or more sulphide compounds and with one or more agents for adsorbing organic contaminants, and the phosphoric acid so purified being subsequently separated from solid matter present in the product of the treatment.

It is already known that phosphoric acid containing sulphuric acid can be treated with a calcium compound so as to make it possible for the sulphuric acid to be partially eliminated by the precipitation of calcium sulphate and separation of the precipitate.

It is also known that the fluorine content in phosphoric acid can be reduced by the addition of substances providing silicic acid and sodium, which are added to the phosphoric acid either when removing sulphuric acid therefrom or in a separate treatment, and that heavy metals present in the phosphoric acid can be precipitated in sulphide form by the addition of substances liberating hydrogen sulphide.

Attempts have also been made to free phosphoric acid from organic contaminants by means of active carbon or other adsorbents.

German Patent Specification ("Auslegeschrift") No. 1,265,725, for example, describes a process for making aqueous phosphoric acid solutions of improved purity, wherein the acid is treated with a calcium compound to effect the precipitation of excess sulphuric acid and also with $CaSO_4 \cdot 2H_2O$ seed crystals and an alkali metal fluosilicate, and the resulting suspension is cooled down to temperatures of 0° to 50° C. The process also provides for the calcium sulphate dihydrate to be precipitated in the presence of adsorbents and sulphides.

This known process, however, is less than fully satisfactory, for the following reasons. Firstly, it can only be used for the purification of phosphoric acid of a rather low concentration (containing 300–420 g of $P_2O_5$ per liter, i.e. 20–30 % of $P_2O_5$), in which calcium sulphate dissolves more easily than in more concentrated phosphoric acid; accordingly it yields solutions having relatively high proportions of sulphuric acid therein. In addition to this, following the addition of the precipitant and seed crystals to the suspensions, it is necessary for the latter to be cooled, which is a difficult and especially a time-consuming step when the process is carried out on an industrial scale. Even more serious, however, is the loss of phosphoric acid which arises from the fact that considerable quantities of $CaHPO_4 \cdot 2H_2O$, which is isomorphous with $CaSO_4 \cdot 2H_2O$, go into the precipitate in all those cases in which sulphuric acid is precipitated with the formation of calcium sulphate dihydrate.

Similar processes have been disclosed in French Pat. Nos. 1,334,532 and 1,344,533, wherein phosphoric acid containing approximately 30 weight % of $P_2O_5$ is admixed with the usual reagents for freeing it simultaneously from sulphuric acid, fluorine and organic contaminants.

The temperatures used in these known processes for effecting precipitation and allowing the material to mature are again low, e.g. 45° C. Despite this, the resulting purified acid contains $SO_4$ and F in minimum proportions which can be as high as 2 and 0.6 weight %, respectively. These two known processes thus present disadvantages similar to those described hereinabove in connection with the process of German Patent Specification ("Auslegeschrift") No. 1,265,725. In other words, their use is practically limited to those cases in which crude phosphates are processed to obtain phosphoric acid containing not more than approximately 30 weight % of $P_2O_5$, for use as either an intermediate or a final product. Commercial phosphoric acids, however, generally contain 50 to 54 weight % of $P_2O_5$. Such high $P_2O_5$ acids have almost exclusively been used heretofore for purposes where the degree of contamination with sulphuric acid, fluorine, heavy metals or organic material is not a very critical factor, and more particularly for the production of all kinds of phosphatic fertilizers.

Highly concentrated acids are, however, gaining increasing interest for the production of commercial phosphates in general, i.e. not merely in the fertilizer field, and this interest is growing with the increasing availability of technically improved and commercially attractive methods for the purification especially of phosphoric acid which has been wet-processed by extraction.

Especially in those cases in which it is desirable to have rather pure material, it is necessary for the phosphoric acids to be prepurified or freed from other acids, heavy metals and organic contaminants. As a result, the art is in great need of a process permitting concentrated wet-processed phosporic acid to be purified or prepurified under commercially really attractive conditions.

According to the present invention, we provide a process for purifying crude wet-processed phosphoric acid containing free sulphuric acid, at an elevated temperature, by treating the acid to be purified with a calcium compound the nature and proportion of which are such as to precipitate the sulfuric acid in the form of calcium sulphate, the acid to be purified being treated also with calcium sulphate seed crystals and with one or more alkali metal compounds, silicic acid or a derivative thereof, and one or more sulphide compounds and with one or more agents for adsorbing organic contaminants, and the phosphoric acid so purified being subsequently separated from solid matter present in the product of the treatment, which process comprises: treating the wet-processed phosporic acid in a reaction zone, at a temperature of 70° C to 100° C, preferably 80° to 100° C, with the respective calcium compound, and with the calcium sulphate seed crystals, in the presence of the one or more alkali metal compounds, silicic acid or a derivative thereof, and one or more sulphide compounds, and in the presence of active carbon effective as an adsorbent; precipitating thereby the sulphuric acid in the form of calcium sulphate semihydrate with the resultant formation of a suspension; recycling a proportion of the suspension, with calcium sulphate semihydrate seed crystals present therein, to the reaction zone; treating the balance of the suspension for the separation of purified phosphoric acid from the accompanying precipitate; transforming the precipitate into an aqueous suspension containing up to 30 weight % of phosphoric acid and converting the calcium sulphate semihydrate in said suspension at 20° to 70° C into calcium sulphate dihydrate; separating the aqueous phase of the suspension from the solid matter therein, and water-washing the solid matter; recycling a proportion of the aqueous phase so separated, and a proportion of the wash water, for use in suspending and converting calcium sulphate semihydrate as aforementioned; and combining the balance of the aqueous phase and wash water with the said purified phosphoric acid.

The process of the present invention enables concentrated wet-processed phosphoric acids, particularly those which contain 45 to 55 weight % of $P_2O_5$, to be purifed. With respect to the first-mentioned suspension, it is preferable for a proportion of it to be recycled to the reaction zone after a period of 45 to 60 minutes, and for the calcium sulphate semihydrate to be converted to calcium sulphate dihydrate at a temperature of 40 to 50° C. The proportions of the aqueous phase separated from the calcium sulphate dihydrate and of wash water which are recycled for use in suspending and converting calcium sulphate semihydrate are preferably proportions which provide a suspension having a solids content of 10 to 20 weight %, and more preferably approximately 12 weight %. A further preferred feature which facilitates filtration of the semihydrate and later of the dihydrate comprises adding the calcium compound, alkali metal compound(s), silicic acid or derivative thereof, and sulphide compound(s), and the active carbon, in proportions which provide a ratio of calcium sulphate semihydrate to active carbon within the range 10:1 to 15:1, and a ratio of calcium sulphate semihydrate to other solid matter in the first-mentioned suspension, after precipitation, of approximately 7:1. In the event of the process being carried out continuously, it is particularly advantageous for the one or more sulphide compounds to comprise hydrogen sulphide, and for the phosphoric acid to be purified to be treated with the hydrogen sulphide before either of them reaches the reaction zone. It is also advantageous in the present process that, for a fluorine content of approximately 1 weight %, the phosphoric acid to be purified should contain at least 6.5 weight % of $H_2SO_4$, calculated on its $P_2O_5$ content, or an equivalent proportion (i.e. equivalent with respect to the sulphuric acid) of alkali metal sulphate.

The process of the present invention offers a series of technically beneficial effects. To begin with, it enables the loss of phosphoric acid to be kept to a minimum by precipitating the sulphuric acid in the form of calcium sulphate semihydrate, recrystallizing the calcium sulphate semihydrate in the form of the dihydrate, and thoroughly washing the dihydrate; it further enables the concentration of the incoming phosphoric acid to be only slightly reduced by the recycling of the filtrate from the separation of the calcium sulphate dihydrate. In addition to this, the separation of nornally difficultly filterable silicofluoride and sulphide precipitates is less of a technical problem than in the prior art, as these compounds can be entrained in a relatively easily filterable calcium sulphate semihydrate sludge or slurry if they are precipitated jointly with the semihydrate. Phosphoric acids purified by the process of the invention can contain very minor proportions of sulphate and fluorine and can be substantially free from organic contaminants. The fact that it is not necessary for the present reaction medium to be cooled intermediarily and thereafter reheated is a further considerable improvement in the art, having regard both to the technical and to the commercial aspects of the purification process.

The calcium compound employed to precipitate the sulphuric acid in the form of calcium sulphate should preferably be ground lime, hydrate of lime, calcium carbonate or crude calcium phosphate. It may conveniently be added in stoichiometric proportions, based on the sulphate, so as to avoid the presence of an unnecessary excess of calcium in the solution.

Fluorine is precipitated in the form of sodium silicofluoride by means of the silicic acid or derivative thereof. A particularly convenient silicic acid derivative is water glass. It is possible to employ silicic acid in the form of (e.g.) kieselguhr or phosphorus furnace slag, which may be used in admixture with an alkali liquor or alkali metal sulphate, and which is preferably added in stoichiometric proportions. No silicic acid or derivative thereof need be added in those cases in which the crude phosphoric acid itself has sufficient silicic acid therein, and the references herein to treatment in the presence of silicic acid or a derivative thereof are to be construed accordingly.

With respect to heavy metal sulphides, it is possible for them to be precipitated from the crude phosphoric acid by the addition of $H_2S$ to the acid before it reaches the above-mentioned reaction zone, or by the addition of an alkali metal or alkaline earth metal sulphide thereto, within the reaction zone. Organic contaminants in the crude phosphoric acid are adsorbed by the active carbon, of which 0.1 to 1.0 calculated on the $P_2O_5$, is usually needed, depending on the particular phosphoric acid used.

The separation of the various precipitates from the phosphoric acid may conveniently be achieved by means of one or more pressure filters. The filtration capacity required will depend upon the various factors discussed above and upon the residence time of the material therein. Under ordinary filtration conditions, i.e. under pressures within the range 0 to 5 atmospheres gauge, the filtration capacity should preferably be approximately 180 liters of filtrate per $m^2$ per hour for short residence times of 0.5–1 hour. The advisable filtration capacity increases to 300 liters per $m^2$ per hour for residence times within the range 5 to 7 hours.

It is possible for the dihydrate to be filtered off continuously with the use of a rotating vacuum drum filter. Under the above-mentioned ordinary filtration conditions, the average filtration capacity of this type of filter should preferably be 650 liters of filtrate per $m^2$ per hour, or 100 kg of filter cake (moist with adhering water) per $m^2$ per hour.

The filter cake is preferably washed continuously on the filter with fresh water, the filtrate from this washing being combined with the primary filtrate from the vacuum filter, so that it is impossible for the $P_2O_5$ concentration in the resulting solution to increase beyond a certain value. Approximately ⅓ of the combined filtrates is preferably added continuously to the purified phosphoric acid, the balance (i.e. approximately ⅔) thereof being recycled and re-used for converting semihydrate to dihydrate. In a typical case, the $P_2O_5$ loss associated with the separation of calcium sulphate dihydrate is approximately 0.5%, under these conditions.

If the present process is applied to phosphoric acid containing about 51% of $P_2O_5$, the filtrate from the semihydrate filtration stage, to which has been added a proportion of filtrate from the dihydrate filtration stage, has in a typical case an approximate composition as follows: 47% of $P_2O_5$; 0.8 % of $SO_4$, based on $P_2O_5$; 0.24 % of Ca, based on $P_2O_5$; and 0.5 % of fluorine, based on $P_2O_5$.

In this typical case the phosphoric acid contains altogether approximately 1 ppm of heavy metal contaminants and between 150 and 300 ppm of C, depending on the origin of the crude acid.

In addition to a process as defined earlier, the present invention includes an apparatus suitable for use in carrying out that process, comprising: a first agitator-containing reactor provided with a first feed pipe for wet-processed phosphoric acid, a second feed pipe for a calcium compound, a third feed pipe for at least one alkali metal and/or silicic acid compound, and a metering admission means for active carbon, all three feed pipes and the metering means opening into the reactor, and the reactor being provided also with an overflow; an agitator-containing first reservoir connected to the first reactor by means of said overflow; an outlet line from the first reservoir, a branch line and a pressure filter, the outlet line running back from the first reservoir to the first reactor and the branch line connecting the outlet line with the pressure filter; a filtrate conveying line, a second reservoir, a filter cake-conveying line, a second agitator-containing reactor having an outlet line and a rotating filter; the filtrate conveying line connecting the pressure filter to the second reservoir, the filter cake-conveying line connecting the pressure filter to the second reactor, and the outlet line of the second reactor running to the rotating filter; a wash water feed line opening on to the rotating filter; a filter cake discharge means cooperating with the rotating filter; a second filtrate conveying line, and a washed filtrate-conveying line, both running from the rotating filter to, and opening into, a collecting tank having a bottom outlet, and the said bottom outlet leading to a pipe which is bifurcated to feed one branch line running back to the second reactor and another branch line running to the second reservoir. The first feed pipe or the first reactor may additionally be provided with a hydrogen sulphide or alkali metal sulphide inlet.

A preferred embodiment of the apparatus of the present invention will now be described with reference to the accompanying drawing, the single FIGURE of which is a diagrammatic side view of the said embodiment.

In the case to which the drawing relates, phosphoric acid which contains 50 weight % of $P_2O_5$, which is at a temperature of 80° C, and which has been treated with $H_2S$ is conveyed through a line 1 to a first reactor 4, in which it is admixed with a recycled suspension having precipitated $CaSO_4$ semihydrate suspended therein. The suspension comes from a reservoir 7 and is recycled through a line 3. Lime or another calcium-containing reagent coming from a reservoir 24, through a line 5, is added in metered quantities by means of a conveying-belt weighing device the use of which is diagrammatically indicated at 25. At the same time, reactor 4 is charged with sodium hydroxide solution, or a solution of sodium sulphate in admixture with water glass or another silicic acid-containing substance, through a line 2, and with active carbon, through a metering device 6. The resulting suspension is conveyed from the first reactor 4 to the reservoir 7, in which it is allowed to remain for (on average) a period of 4 hours, with agitation, at 85° C. Line 3 is used not only for the above-mentioned recycling but also to deliver a portion of the suspension through a line 8 to a pressure filter 9, in which the phosphoric acid is separated from the $CaSO_4$ semihydrate. The filtered phosphoric acid flows through a filtrate line 10 into a reservoir 11, whereas the $CaSO_4$ semi-hydrate separated from it in filter 9 is delivered to a second reactor 13, by means of a line 12. In the second reactor 13, the filter cake from the filter 9 is treated with a mixture of another filtrate and wash water, this mixture being brought from a collecting vessel 19, through a return line 14, and is thereby converted at 40° C into $CaSO_4$ dihydrate. The conversion product accumulating in the lower portion of the reactor 13 is pumped through a line 15 to a rotating filter 16, and the resulting filtrate is conveyed to the collecting vessel 19 through a line 17. The filter cake from the filter 16 is washed with fresh water coming from line 21, and thereafter passes to discharge means 20. The filtrate resulting from this washing leaves filter 16 through a line 18, and is united in the collecting vessel 19 with the primary filtrate coming from the rotating filter through the line 17. Approximately two-thirds of the resulting solution is recycled through the return line 14 to the second reactor 13 and re-used for the conversion of $CaSO_4$ semihydrate to dihydrate therein, and the balance, i.e. approximately one-third, is conveyed through a line 22 to the reservoir 11, and is there united with the purified phosphoric acid containing filtrate from the filter 9. The combined phosphoric acid containing solution is discharged through a line 23.

The pipe 1, or the first reactor 4, may be additionally provided with a hydrogen sulphide or alkali metal sulphide feed pipe.

The following Examples further illustrate the invention, which is not, however, limited thereto.

EXAMPLE 1

An apparatus as shown in the accompanying drawing was used. 156.29 kg/h of crude phosphoric acid (from Khouviga phosphate) which contained 51.26 % of $P_2O_5$, 3.32 % of $H_2SO_4$, 0.51 % of F, 0.16 % of Ca and traces of copper and arsenic, which was at a temperature of 80° C, and which had been treated earlier with hydrogen sulphide gas, was introduced into the first reactor 4 and mixed therein with 0.56 kg/h of active carbon, 1.52 kg/h of water glass, 0.8 kg/h of a 50% sodium hydroxide solution, and recycled suspension from the reservoir 7. 2.97 kg/h of unslaked lime from the respective reservoir 24 was added at the same time, at a maximum temperarture of 95° C. The suspension travelled continuously from the first reactor 4 to the reservoir 7, in which it was allowed to remain for 2 hours at a mean temperature of 85° C. By means of lines 3 and 8, the suspension was delivered to the pressure filter 9 and filtered therein under a pressure which was increased gradually from 0 to at most 6 atmosphere gauge.

138.65 kg/h of filtrate, containing 52.0 % of $P_2O_5$, 0.30 % of $SO_4$, 0.13 % of Ca and 0.17 % of F, was delivered from the pressure filter to the reservoir 11, through the line 10. 23.0 kg/h of sludge, comprising $CaSO_4$ semihydrate, sodium silicofluoride, active carbon, adhering organic contaminants, and arsenic and copper sulphides, was separated, and was delivered from the pressure filter to the second reactor 13 and mixed therein with 65 kg/h of filtrate (from the second filtration step) coming from the collecting vessel 19. The recycled filtrate contained 21.9 % of $P_2O_5$, 0.66 % of $SO_4$, 0.27 % of Ca and 0.56 % of F. The second reactor 13 was operated continuously, and was found to contain sufficient CaSO₄ dihydrate crystals for the purpose of seeding, these being crystals introduced thereinto after crystallizing out from previously treated suspension. After a mean residence time of 45 minutes, during which the CaSO₄ semihydrate underwent conversion to dihydrate, the suspension was filtered by means of a rotating vacuum drum filter 16. On the filter, which worked continuously, the retained dihydrate sludge was washed with 20.85 kg/h of fresh water. The primary filtrate and the filtrate resulting from this washing were united in the collecting vessel 19 and mixed therein. 29.25 kg/h of the resulting solution was pumped into the reservoir 11 and mixed with the filtrate from the pressure filter 9. 167.90 kg/h of purified solution, containing 46.75 % of $P_2O_5$, 0.37 % of $SO_4$, 0.15 % of Ca, and 0.24 % of F, was obtained as the final product.

This product contained altogether 1 ppm of heavy metals and 160 ppm of C. Dihydrate sludge was discharged from the rotating filter 16 at a rate of 14.60 kg/h, this sludge containing 28.9 % of adhering water with (per hour) 0.4 kg of $P_2O_5$, 0.65 kg of $NaSiF_6$, 0.56 kg of active carbon and organic substances adhering thereto, 7.66 g of CuS, and 3.13 % of $As_2S_3$.

EXAMPLE 2

The apparatus was as used in Example 1. 100 l/h of crude phosphoric acid (prepared from Youssoufia phosphate) which contained approximately 51% of phosphoric acid, 2.5 % of $H_2SO_4$, 0.51 % of F, 0.2 % of C, and traces of copper and arsenic, which was at a temperature of 80° C, and which had been treated earlier with gaseous hydrogen sulphide, was introduced into the first reactor 4 and mixed therein with 1.91 kg/h of $NaSO_4$. Simultaneously there was recycled from the reservoir 7 a proportion of a phosphoric acid suspension containing precipitated $CaSO_4$ semihydrate, sodium silicofluoride, heavy metal sulphides, and active carbon with adsorbed organic contaminants. 5.46 kg/h of $CaCO_3$ coming from the respective reservoir 24 was added by means of the conveyor-belt weighing device 25 to the mixture of material in the first reactor 4 to effect the formation of additional $CaSO_4$ semihydrate. 0.71 kg/h of silicic acid and 0.5 kg/h of active carbon were added at the same time. The resulting suspension was delivered to the reservoir 7 and from there to the pressure filter 9, where it was filtered. $CaSO_4$ semihydrate was filtered off, recrystallized to dihydrate as in Example 1, separated in the rotating vacuum filter 16 fom its mother liquor, and washed with water. The mother liquor and wash water were united in the collecting vessel 19. ⅔ of the resulting solution was recycled to the second reactor 13, and the balance (⅓) was united in the reservoir 11 with filtrate from the pressure filter 9. The solution contained 47.5 % of $P_2O_5$, 0.31 % of $SO_4$, 0.19 % of F, and organic contaminants and heavy metals in similar quantities to those indicated in Example 1.

We claim:

1. A process for purifying crude wet-processed phosphoric acid containing 45–55% $P_2O_5$ and several percent free sulphuric acid and further contaminants by adding to the phosphoric acid to be purified at an elevated temperature a calcium compound in equimolar proportions based on the sulphuric acid to precipitate the sulphuric acid in the form of calcium sulphate and avoid an excess of calcium; adding further to the phosphoric acid calcium sulphate seed crystals and at least one compound selected from the group consisting of alkali metal-, silicic acid and sulphidecompounds as precipitating agents for the further contaminants together with an adsorbent for organic contaminants; and separating the phosphoric acid so purified subsequently from solid matter present in the mixture obtained; adding to the crude wet-processed phophoric acid containing from 45 to 55 weight % of $P_2O_5$ in a reaction zone, at a temperature of 80 to 100° C, the calcium compound and the calcium sulphate seed crystals in the form of calcium sulphate semihydrate in the presence of the precipitating agents and active carbon as the adsorbent whereby easily filterable precipitates form; precipitating thereby the sulphuric acid in the form of calcium sulphate semihydrate together with the further contaminants with the resultant formation of a first suspension, passing off the said first suspension from the reaction zone; recycling a portion of the first suspension to the reaction zone; separating the balance of the first suspension into purified phosphoric acid and solid matter; preparing from the solid matter an aqueous second suspension containing up to 30 weight % of phosphoric acid and converting the calcium sulphate semihydrate in the aqueous second suspension at 20° to 70° C into calcium sulphate dihydrate; separating the aqueous phase of the aqueous second suspension from the solid matter therein, and water-washing the separated solid matter; recycling a portion of the separated aqueous phase and a portion of the wash water, from preparing the afore-mentioned aqueous second suspension containing the calcium sulphate semihydrate and combining the balance of the aqueous phase and wash water with the purified phosphoric acid whereby the sulphuric acid content of the purified phosphoric acid is minimized.

2. The process as claimed in claim 1, wherein a portion of the first suspension is recycled to the reaction zone after a period of 45 to 60 minutes.

3. The process as claimed in claim 1, wherein the calcium sulphate semihydrate in the aqueous second suspension is converted to calcium sulphate dihydrate at a temperature of 40° to 50° C.

4. The process as claimed in claim 1, wherein portions of the calcium compound, alkali metal compound(s), silicic acid, and sulphide compound(s), and the active carbon, which are employed are portions which provide a ratio by weight of calcium sulphate semihydrate to other solid matter in the first suspension, after precipitation, of approximately 7 : 1.

5. The process as claimed in claim 1, wherein phosphoric acid having been treated with hydrogen sulphide is used as the phosphoric acid to be purified.

6. The process as claimed in the claim 1, wherein the active carbon is added in a portion sufficient to establish in the first suspension, after precipitation, a ratio by weight of calcium sulphate semihydrate to active carbon within the range 10 : 1 to 15 : 1.

7. The process as claimed in claim 1, wherein the phosphoric acid to be purified contains fluorine in an amount of approximately 1 % by weight and $H_2SO_4$ in an amount of at least 6.5 % by weight or alkali metal sulphate in a molar equivalent to the aforesaid amount of $H_2SO_4$, all amounts being calculated on the $P_2O_5$-content of the phosphoric acid.

8. The process as claimed in claim 11, wherein the portions of the separated aqueous phase and of washwater are portions which provide the aqueous second suspension having a solids content of 10 to 20 weight %.

9. The process as claimed in claim 8, wherein the said portions are portions which provide suspension having a solids content of 12 weight %.

* * * * *